Sept. 9, 1930.  F. B. HEWEL  1,775,556
UNIVERSAL JOINT
Filed May 11, 1929

WITNESSES

INVENTOR
Frank B. Hewel
BY
ATTORNEY

Patented Sept. 9, 1930

1,775,556

UNITED STATES PATENT OFFICE

FRANK B. HEWEL, OF PITTSBURGH, PENNSYLVANIA

UNIVERSAL JOINT

Application filed May 11, 1929. Serial No. 362,243.

My invention relates to universal joints and particularly to the type of universal joint in which a flexible disc is employed.

Usually the disc referred to is held to the mounting by bolts at the outer edges and by attaching a yoke on opposite sides straddling the disc. In the form referred to as usually employed misalignment soon develops, causing looseness and resulting in wabbling which requires frequent replacement.

The general object of my invention is to provide a novel means for holding the flexible disc of the universal joint at the inner and outer edges in a manner that the disc will be held to the two shaft sections and will respond to the driving movement of either.

The nature of my invention and the distinguishing features in which the invention resides, as well as their advantages, will clearly appear as the description proceeds.

Reference is to be had to the accompanying drawings forming part of this specification, it being understood that the drawings are merely illustrative of one example of the invention.

Figure 1:
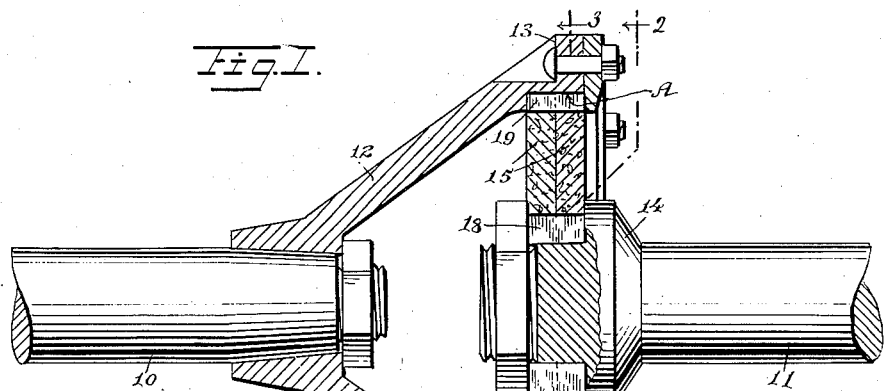
Figure 1 is a longitudinal section showing two shaft sections connected by a universal joint embodying my invention.
Figure 4:
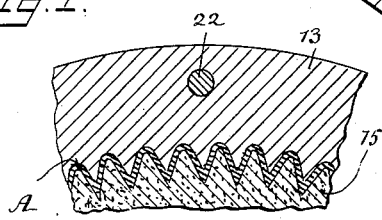
Figure 4 is an enlarged fragmentary view in transverse section illustrating a thickness of material around the teeth of the disc 15; this material may constitute rubber vulcanized in place or it may be of metal or any other suitable material which will properly strengthen the teeth.
Figure 2:
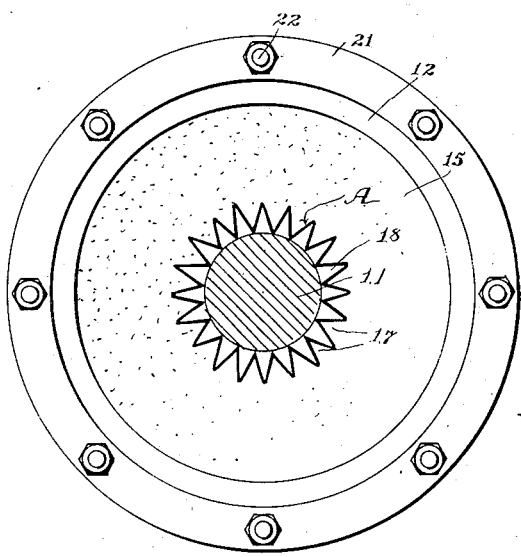
Figure 2 is a transverse section on the line 2—2 of Figure 1.
Figure 3:
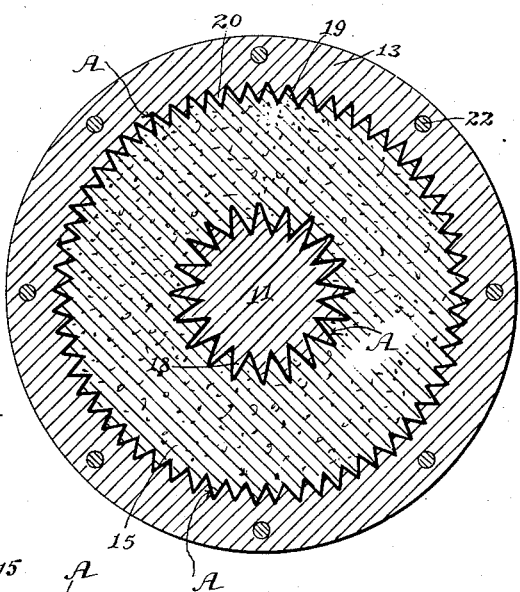
Figure 3 is a transverse section on the line 3—3 of Figure 1.
Figure 5:
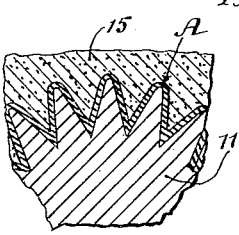
Figure 5 is a fragmentary view similar to Figure 4 showing the thickness of the material around the teeth of the shaft section 11.

In the illustrated example of my invention, the numerals 10 and 11 indicate separate shaft sections either of which may be the driven shaft, the present example indicating that shaft section 10 may be considered the drive shaft and shaft section 11 the driven shaft.

On shaft section 10 is a head 12 of conical or bell-shape form, in the illustrated example said head having at its enlarged end an outwardly directed radial flange 13, here shown as vertically disposed. On the shaft section 11 is an enlargement or hub 14 through which is secured disc 15, here shown as of two thicknesses since it may be of one or many thicknesses according to the strength of disc desired. This disc 15 is flexible to permit of universal movement by flexure thereof by the disposition of one shaft at an angle to the axis of the other. The disc is held in place by a nut 16, in the present example threaded on to that end of the shaft section 11 opposed to the shaft 10. The disc can be formed round, square, oval or of any desired shape.

The disc 15 in accordance with my invention is interengaged with the head 12 and with the hub 14 as follows: On the disc 15 at the central bore thereof is formed an annular series of serrations or teeth 17, or any irregular edge desired at the inner or outer face of the disc, and these are received in interdental spaces between the teeth of a mating annular series 18 on the shaft 11 at the hub 14. Thus the disk is securely interengaged with the shaft 11 at the eye or bore of the disc 15. Similarly, at the periphery of the disc 15 an annular series of teeth is produced and these teeth 19 are received in the interdental spaces between a similar series of opposed teeth 20 on the head 12, adjacent the flange 13.

To strengthen the teeth of the several parts and to insure proper connection and function to withstand wear and yet allow the desired flexibility, the teeth of all the parts may have a thickness of rubber vulcanized around the same and to adjacent parts, said thickness being given the reference character A, and when rubber is employed it may be vulcanized, and when another material is employed an adhesive or any other desired securing means suitable for the material may be utilized.

While I have described my invention as illustrated in the drawings I would have it distinctly understood that I do not wish to be limited to the materials employed nor to the exact manner of securing the parts together as I may employ such well known medium of attachment as vulcanization, welding or any other securing medium between the parts.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A universal joint including two separate shaft sections, one adapted to be driven from the other, a head on one shaft section extending into the plane of the end of the other shaft section, a flexible disc constituting a connecting medium between the head and the other shaft, said head, disk and shaft centrally of the disc having an annular series of teeth thereon and said parts vulcanized together around the teeth.

2. A universal joint including two separate shaft sections, one adapted to be driven from the other, a head on one shaft section extending into the plane of the end of the other shaft section, a flexible disk constituting connecting means between the head and the other shaft, said disk composed of a flexible material whereby the shafts may be operated at an angle to each other, and reinforcing material between the disk and both of said shaft members vulcanized to the parts.

FRANK B. HEWEL.